United States Patent [19]

Roby et al.

[11] Patent Number: 5,670,614
[45] Date of Patent: Sep. 23, 1997

[54] METHOD OF INCREASING THE PLASTICITY AND/OR ELASTICITY OF POLYMERS VIA SUPERCRITICAL FLUID EXTRACTION AND MEDICAL DEVICES FABRICATED THEREFROM

[75] Inventors: Mark S. Roby, Killingworth; Nagabhushanam Totakura, North Haven; Christopher T. Christoforou, Hamden, all of Conn.

[73] Assignee: United States Surgical Corporation, Norwalk, Conn.

[21] Appl. No.: 478,329

[22] Filed: Jun. 7, 1995

Related U.S. Application Data

[63] Continuation-in-part of Ser. No. 295,977, Aug. 25, 1994, Pat. No. 5,478,921.

[51] Int. Cl.[6] .................... C08G 63/08; C08F 6/00
[52] U.S. Cl. ............... 528/480; 528/354; 528/357; 528/361; 528/491; 528/492; 528/495; 528/497; 521/40; 521/40.5; D24/119
[58] Field of Search .................. 528/354, 357, 528/361, 480, 491, 492, 495, 497; 521/40, 40.5; D24/119

[56] References Cited

U.S. PATENT DOCUMENTS

| | | |
|---|---|---|
| 3,186,961 | 6/1965 | Sears . |
| 3,565,869 | 2/1971 | DeProspero . |
| 3,636,956 | 1/1972 | Schneider . |
| 3,683,511 | 8/1972 | Johnson et al. . |
| 3,792,010 | 2/1974 | Wasserman et al. . |
| 4,223,128 | 9/1980 | Halek et al. . |
| 4,483,888 | 11/1984 | Wu . |
| 4,591,629 | 5/1986 | El-Ghatta et al. . |
| 4,634,761 | 1/1987 | Mendiratta et al. . |
| 4,649,162 | 3/1987 | Roche et al. . |
| 4,703,105 | 10/1987 | Allada . |
| 4,810,775 | 3/1989 | Bendix et al. . |
| 4,892,931 | 1/1990 | Knerr . |
| 4,902,780 | 2/1990 | Bourrain et al. . |
| 4,918,160 | 4/1990 | Kondoh et al. . |
| 4,990,595 | 2/1991 | Traechkner et al. . |
| 5,041,529 | 8/1991 | Shinoda et al. . |
| 5,049,647 | 9/1991 | Al-Ghatta . |
| 5,080,845 | 1/1992 | Herrmann et al. . |
| 5,102,983 | 4/1992 | Kennedy . |
| 5,106,906 | 4/1992 | Meier et al. . |
| 5,221,731 | 6/1993 | Weymans et al. . |
| 5,229,486 | 7/1993 | Paul et al. . |
| 5,237,048 | 8/1993 | Miyakawa et al. . |
| 5,248,763 | 9/1993 | Kirsch et al. . |
| 5,250,658 | 10/1993 | Paul et al. . |
| 5,356,538 | 10/1994 | Wai et al. . |
| 5,478,921 | 12/1995 | Roby et al. .................. 528/480 |

OTHER PUBLICATIONS

CO2 in solvent extraction; Papers presented at a meeting of the SCI Food Group Food Engineering Panel, held in London on 4 Feb. 1982; Co2 as a solvent: its properties and applications, H. Brogle.

Design and Control of CO2 Extraction Plants, May 20–22, 1991, Boston, MA; Sims et al.

Encyclopedia of Polymer Science and Engineering, Supplemental Volume, pp. 568–647, Copyright 1989 by John Wiley & Sons (1989).

*Primary Examiner*—James J. Seidleck
*Assistant Examiner*—Duc Truong

[57] ABSTRACT

A method of treating a polymer involves contacting the polymer with a supercritical fluid under conditions of temperature and pressure to incorporate the supercritical fluid in the polymer and thereby effectuate an increase in plasticity and/or elasticity of the polymer. In a particular embodiment, the treated polymer is a biocompatible polymer which is fabricated into a medical device or part thereof.

3 Claims, 1 Drawing Sheet

IN VITRO FLEX STRENGTH ABSORPTION

METHOD OF INCREASING THE PLASTICITY AND/OR ELASTICITY OF POLYMERS VIA SUPERCRITICAL FLUID EXTRACTION AND MEDICAL DEVICES FABRICATED THEREFROM

RELATED APPLICATIONS

This application is a continuation-in-part application of application Ser. No. 08/295,977 filed Aug. 25, 1994, now U.S. Pat. No. 5,478,921.

BACKGROUND

1. Technical Field

This disclosure relates to a method of increasing the plasticity and/or elasticity of polymers via supercritical fluid extraction (SFE) and to articles fabricated from such treated polymers.

2. Background of Related Art

A supercritical fluid is a dense gas that is maintained above its critical temperature, i.e., the temperature above which it cannot be liquified by pressure. Supercritical fluids exhibit a unique combination of solvent and transport properties and have been employed in the extraction of impurities from a wide variety of polymeric materials. See, e.g., U.S. Pat. Nos. 4,703,105, 4,892,931, 4,902,780, 4,918,160, 4,990,595, 5,049,647, 5,221,731, 5,229,486, 5,237,048, 5,248,763 and 5,250,658.

The supercritical fluid extraction method involves contacting a polymer with an extractant under supercritical conditions of temperature and pressure to extract residual impurities from the polymer and thereafter recovering the resulting purified polymer. The method results in a substantial reduction of impurities without adversely affecting the molecular weight, viscosity and other physical properties of the polymer. In addition, thorough extractions can be obtained by the SFE method, normally obviating the necessity of further purification of the polymer.

Materials which can be purified of residual impurities in accordance with the SFE method include bioabsorbable polymers which can be fabricated from such monomers as glycolic acid, glycolide, lactic acid, lactide, p-dioxanone, trimethylene carbonate, dimethylene trimethylene carbonate, dioxepanone, alkylene oxalates, epsilon-caprolactone, and the like. Many of these polymeric materials, in particular, those polymers fabricated from glycolic acid, glycolide, lactic acid and/or lactide, possess a high order of crystallinity. Nonbioabsorbable biocompatible polymers which can be purified by SFE and which exhibit a high order of crystallinity include polyethylene, polypropylene, poly(ethylene terephthalate), poly (hexamethylene adipamide) and polytetrafluoroethylene. It is well known that crystalline polymers tend to be stiff and rigid due to their highly ordered molecular structures.

Plasticizers are substances that when mixed with polar or hydrogen bonded polymers or crystalline polymers position themselves between the intermolecular bonds of the polymers, thus increasing the spacing between adjacent bonds. In this manner, plasticizers decrease the magnitude of the intermolecular forces and thereby increase the flexibility of the polymeric structure. For example, polyvinylchloride, which is polar, is plasticized by substances such as dioctylphthlate. As another example, poly(hexamethylene adipamide), i.e., nylon, which is hydrogen bonded, is plasticized by water.

U.S. Pat. No. 3,792,010 discloses that sutures fabricated from lactide-glycolide copolymers are extremely stiff, difficult for the surgeon to tie, exhibit memory and tend to retain the shape of the package in which they are stored. To overcome these disadvantages, U.S. Pat. No. 3,792,010 discloses that a non-toxic polar plasticizer, such as bis-2-methoxyethyl phthalate or acetoxy triethyl citrate, may be added to the copolymer. The resulting sutures fabricated from the plasticized copolymer have excellent hand and improved in vivo tensile strength retention. Other patents which disclose the use of plasticizers in the fabrication of polymers include U.S. Pat. Nos. 3,186,961 and 3,636,956. For a thorough discussion of the use of plasticizers in polymeric materials, reference can be made to the chapter entitled "Plasticizers" in *Encyclopedia of Polymer Science and Engineering*, Supplement Volume, Mark et al. eds., John Wiley & Sons (1989).

SUMMARY

It has surprisingly been discovered that supercritical fluid extraction is a viable technique for effectuating appreciable increases in plasticity and/or elasticity of polymers.

Therefore, in accordance with this discovery, the present method for increasing the plasticity and/or elasticity of a polymer involves contacting the polymer with a supercritical fluid under conditions of temperature and pressure to incorporate supercritical fluid in the polymer and thereafter recovering the treated polymer. Polymers treated in accordance with the present method will exhibit increases in plasticity and/or elasticity of from about 0.1 to about 10 times their original plasticity and/or elasticity.

The method herein offers considerable advantages over known methods of plasticizing polymers. A particular advantage of the present method is that the plasticity and/or elasticity of a polymer can be increased substantially without adversely affecting the physical properties of the polymer. In a typical method of plasticizing polymers, the polymer is physically admixed with plasticizer under vigorous stirring and elevated temperature to provide plasticized polymer which is then molded into desirable parts. In accordance with the present method, polymers can be economically treated under relatively mild conditions of temperature and pressure and in a relatively short time. This is a particular advantage when thermally sensitive polymers, e.g., bioabsorbable polymers, are employed. Thus, in a particularly useful embodiment of the present method, the plasticity of a biocompatible polymer is increased by simply contacting the polymer with supercritical fluid under conditions of temperature and pressure to incorporate the supercritical fluid in the polymer. Medical devices and/or parts of medical devices, e.g., sutures, staples, one-piece clips, pins, maxillofacial plates, springs, hinges, etc., can be fabricated in whole or in part from the treated biocompatible polymer. Such medical devices exhibit increased flexibility and resiliency compared to medical devices fabricated from untreated polymers.

As utilized herein the term "plasticity" as applied to a polymer which has been subjected to the method herein shall be understood to refer to the degree to which the polymer will flow or deform under applied stress without breaking. As utilized herein the term "elasticity" as applied to a polymer which has been subjected to the method herein shall be understood to refer to the degree to which the polymer will return to its original shape when an applied stress is removed. The present method has surprisingly been found to be a convenient technique of increasing the plasticity and/or elasticity of polymers.

As utilized herein, the term "biocompatible" as applied to a polymer which is treated in accordance with the present method shall be understood to refer to the nature of such a polymer as being non-toxic and harmless when placed inside a mammalian body.

DETAILED DESCRIPTION OF PREFERRED EMBODIMENTS

Figure 1:
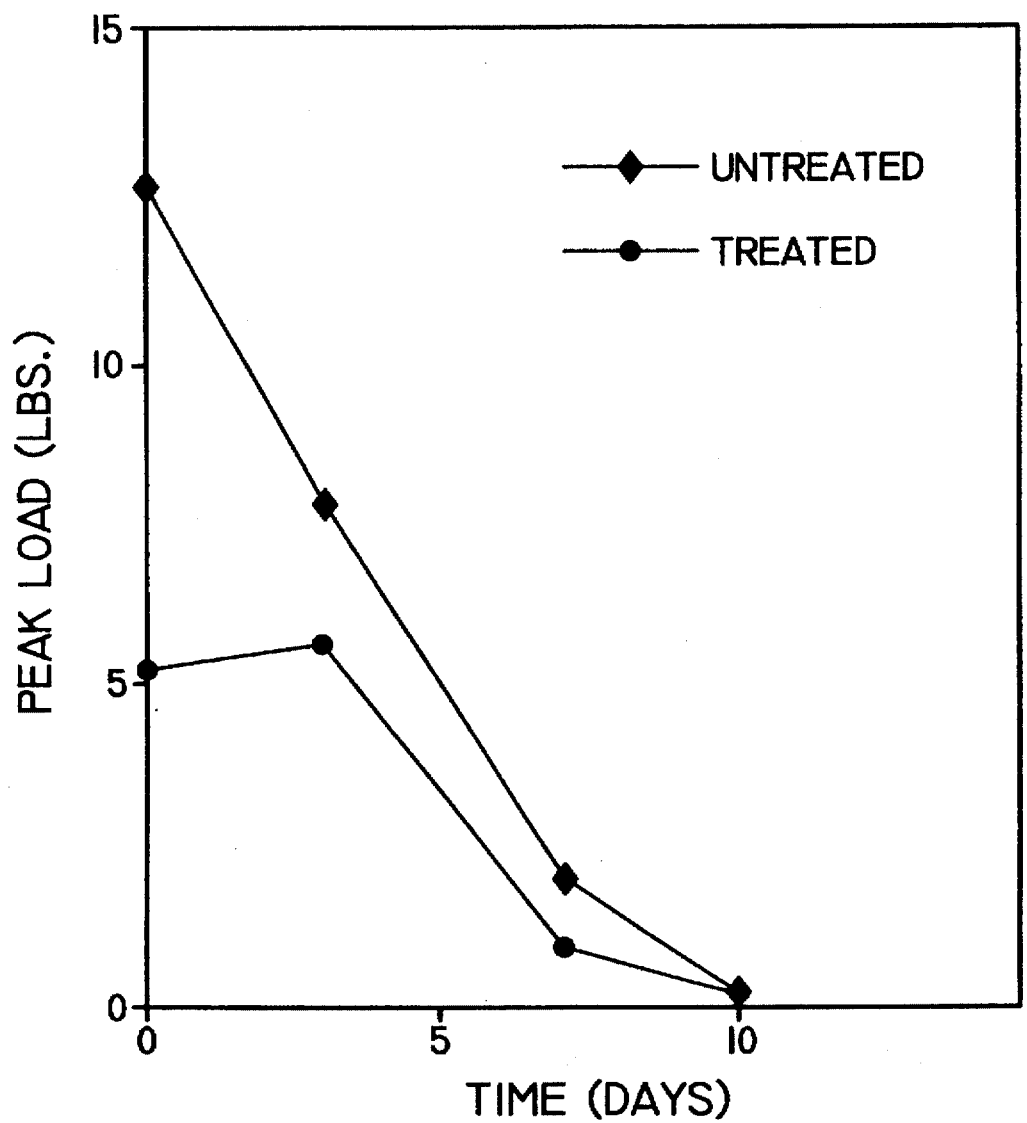
FIG. 1 graphically depicts the results of an in vitro flexural strength study.

The materials plasticized in accordance with the novel method described herein include any natural or synthetic polymeric substance. Particularly preferred are biocompatible polymers which can be fabricated, e.g., molded or extruded, into medical devices, e.g., sutures, staples, clips, pins, etc., or parts employed in medical devices, e.g., springs, hinges, etc. The polymer can be a homopolymer, copolymer, polymeric blend or polymeric composite. Biocompatible polymers include bioabsorbable polymers which are fabricated from such monomers as glycolic acid, glycolide, lactic acid, lactide, p-dioxanone, trimethylene carbonate, dimethylene trimethylene carbonate, dioxepanone, alkylene oxalates, epsilon-caprolactone, and the like. It has been observed that the method herein can increase the plasticity, i.e., flexibility, of such polymers and can render the polymers more elastic so that upon removal of an applied stress, the polymers return to substantially their original shape. Bioabsorbable polymers, when implanted inside the body, degrade into non-toxic, harmless by-products which are eventually removed from the body. It has also been determined that the in vitro flexural strength retention of a bioabsorbable polymer treated in accordance with the method herein can be increased. Preferred bioabsorbable compositions are the homopolymers and copolymers derived from glycolic acid, glycolide, lactic acid and/or lactide. Particularly preferred are the random, block and/or graft copolymers of glycolide and lactide, e.g., a random copolymer composed of approximately 92.5 weight percent glycolide and 7.5 weight percent lactide. Biocompatible polymers also include non-bioabsorbable polymers such as polyolefins, e.g., polyethylene and polypropylene, polyethylene terephthalate, poly(hexamethylene adipamide) and polytetrafluoroethylene.

The polymer can be treated in accordance with the method herein while in the molten or solid state, preferably while in the solid state. In a particularly preferred embodiment, the polymer is first fabricated, e.g., molded, into a desired article, for example, a medical device or part thereof, and the article is thereafter subjected to the method herein.

It should be understood that the polymer treated in accordance with the present method can be purified of residual impurities by supercritical fluid extraction or processed by any other known purification technique prior to being subjected to the method herein to increase the plasticity and/or elasticity of the polymer. When supercritical fluid extraction is employed as a technique for purifying the polymer as well as a technique for increasing the plasticity and/or elasticity of the polymer, it should be understood by those skilled in the art that the supercritical fluid extraction process can be controlled so that a suitable amount of supercritical fluid remains in the polymer upon termination of the process. Alternatively, the supercritical fluid extraction process can be carried out so that substantially no supercritical fluid is incorporated in the polymer. Thereafter, in a separate operation, the polymer can be subjected to the present method.

The present treatment method is normally carried out by contacting a polymer with supercritical fluid under conditions of temperature and pressure in any suitable supercritical fluid extraction apparatus. The particular type of apparatus utilized herein is not limited so long as the apparatus enables good contact of the polymer with the supercritical fluid. The basic operation of the apparatus is well known to those skilled in the art and is described in Sims and Thompson, *Design and Control of $CO_2$ Extraction Plants* (Presented at the 2d International Symposium on Supercritical Fluids, May 20–22, 1991, Boston Mass.).

The supercritical fluids which can be utilized as plasticizers to increase the plasticity and/or elasticity of polymers are likewise not limited and include water, carbon dioxide, dinitrogen oxide, carbon disulfide, xenon, aliphatic hydrocarbons such as ethane, ethylene, propane, butane, pentane and hexane, halogenated hydrocarbons, aromatic hydrocarbons such as benzene, toluene and xylene and alcohols such as methanol and ethanol, derivatives thereof and mixtures of two or more of the foregoing. Carbon dioxide or mixtures of $CO_2$ with one or more of the above-mentioned supercritical fluids are preferred since the conditions of temperature and pressure required to render supercritical $CO_2$ are relatively mild and therefore pose little threat to most polymers. Typically, the supercritical fluid which is employed will be gaseous at normal temperatures and pressures and/or will have a boiling point of not more than about 150° C. at normal pressures. Therefore, it is contemplated that the polymer (or article fabricated therefrom) can be stored in an environment which contains the plasticizer under normal, i.e., ambient, temperatures and pressures in order to promote retention of the plasticizer in the polymer. For example, a suture fabricated from a bioabsorbable polymer which has been contacted with supercritical $CO_2$ to incorporate $CO_2$ as plasticizer in the polymer can be stored in a suture package which contains $CO_2$ gas. In this fashion, $CO_2$ incorporated in the polymer will reach equilibrium with $CO_2$ present in the package environment and thereby inhibit diffusion of $CO_2$ out of the polymer.

The specific temperatures and pressures employed to obtain a supercritical fluid in any given case will vary depending on the particular polymer being treated and the supercritical fluid being employed as plasticizer. For reference, the critical constants of some of the aforementioned plasticizers are shown in Table I below.

TABLE I

Critical Constants of Plasticizers

| Plasticizer | Critical Temp. $T_c$ (°C.) | Critical Pressure, $P_c$ (bar) | Boiling Point, (°C.) |
|---|---|---|---|
| Carbon dioxide | 31.2 | 74.0 | −78.3* |
| Dinitrogen oxide | 36.8 | 72.7 | −88.8 |
| Carbon disulfide | 276.4 | 77.0 | 46.4 |
| Ethane | 32.4 | 48.9 | −88.4 |
| Ethylene | 9.8 | 51.2 | −103.6 |
| Propane | 96.7 | 42.6 | −41.9 |
| Butane | 152.6 | 38.0 | 0 |
| Pentane | 197.0 | 33.7 | 36.2 |
| Hexane | 234.9 | 30.3 | 68.9 |
| Benzene | 289.0 | 48.3 | 80.3 |
| Toluene | 320.1 | 42.1 | 110.7 |
| Xylene | 358.1 | 37.4 | 144.5 |
| Methanol | 240.0 | 79.7 | 64.8 |
| Ethanol | 242.8 | 63.9 | 78.5 |

*Sublimation

Generally, the temperature employed in carrying out the method herein is usually about 0.5 to about 5.0 times the critical temperature of the plasticizer, i.e., preferably from about 20° C. to about 150° C., more preferably from about 40° C. to about 125° C. and most preferably from about 80° C. to about 120° C. The pressure employed in carrying out the method herein is usually about 0.5 to about 10 times the critical pressure of the plasticizer, i.e., preferably from about 15 to about 800 bar, more preferably from about 35 to about 500 bar and most preferably from about 50 to about 350 bar. The polymer is preferably maintained in contact with the supercritical fluid plasticizer for a period of time generally not exceeding about 6 hours, more preferably from about 0.1 to about 3 hours and most preferably from about 0.5 to about 1.5 hours. The amount of supercritical fluid employed can vary widely and generally depends on the supercritical fluid being employed and the nature of the polymer being plasticized. In general, the weight ratio of polymer to supercritical fluid will range from about 1:10 to about 1:150 and preferably from about 1:50 to about 1:125. The concentration of plasticizer incorporated in the polymer can vary widely depending on the amount of increase in plasticity and/or elasticity desired. Such concentrations will typically range from about 0.01 to about 1.0 and more preferably from about 0.14 to about 0.28 mg per mg of polymer.

The polymer treated in accordance with the present method can be further processed in accordance with conventional methods such as, e.g., by annealing the polymer. It is also contemplated that any additional processing operations be carried out prior to subjecting the polymer to the method herein.

The following non-limiting examples illustrate the practice of the present method.

EXAMPLE 1

A 92.5:7.5 weight percent random glycolide-lactide copolymer which had been molded into a rectangular bar 0.82" long×0.165" wide×0.04" thick was contacted with supercritical carbon dioxide in a PrepMaster® with Vari-Flow® restrictor from Suprex Corp. (hereinafter "Example 1"). Example 1 was enclosed in a 3 cc sample cartridge having stainless steel filters (2 micron) at the inlet and outlet. Flow of $CO_2$ was upward through the sample. The $CO_2$ was ultrapure SFE-SFC grade and was not recycled but vented after passing through the separator and flow measuring instruments. The concentration of $CO_2$ thereby incorporated in the bar was between about 0.14 and about 0.28 mg $CO_2$ per mg of polymer.

The parameters for the process are summarized in Table II as follows:

TABLE II

| | Example 1 |
|---|---|
| Extraction Conditions | |
| Pressure (atm) | 485 |
| Temp. (°C) | 120 |
| Static Mode (min.) | 10 |
| Dynamic mode (min.) | 120 |
| Vessel Size (mls.) | 3 |
| Restrictor Temp. (°C) | 100 |
| Restrictor Flow Rate (mls./min) | 4.0 |
| Collection Conditions | |
| Collection Temp. (°C) | 40 |
| Desorption Temp. (°C) | 40 |

TABLE II-continued

| | Example 1 |
|---|---|
| Trap Material | SSB* |
| Wash Solvent | $CH_2Cl_2$ |

*SSB = Stainless Steel Balls

Example 1 treated in accordance with the method herein was subjected to an in vitro flexural strength study to determine the effect of the present method on the flexural properties of a polymer treated in accordance therewith.

Comparative Example 1

For comparative purposes, a bar (referred to hereinafter as "Comparative Example 1") fabricated in the same manner and from the same polymer as Example 1 with the exception of not being subjected to the present method was subjected to the in vitro flexural strength study.

Both the treated bar of Example 1 and the untreated bar of Comparative Example 1 were annealed at 100° C.

The rectangular bars of Example 1 and the control were tested at time intervals of 0, 3, 7 and 10 days after being immersed in a Sorenson's buffer solution which simulates the physiological environment of a mammalian body. The bars were tested in accordance with ASTM D790. Thus, the ends of each bar were rested on supports and an Instron® machine positioned above the bar exerted a downward force on the middle portion of each bar. The Instron machine measured the amount of upward force exerted by the bars in response to the downward force. This experiment was continued until the peak load of the bar was attained. Peak load is defined as the load required to either break the bar or deform the bar into a "V" configuration without breaking the bar. The data resulting from the in vitro flexural strength study is graphically presented in FIG. 1.

As can be seen from the graph of FIG. 1, the effect of incorporating supercritical fluid in the polymer resulted in a lowering of its peak load. Specifically, the peak load at 0 days of the treated polymer dropped to about 5 lbs from about 12.5 lbs for the untreated polymer. However, the treated polymer deformed to a "V" configuration at its peak load without breaking whereas the untreated polymer broke under its peak load. In addition, it was observed that when the peak load at 0 days of the treated polymer was removed, the polymer surprisingly returned to substantially its original shape—an entirely unexpected phenomenon since the glycolide-lactide copolymer of Example 1 is ordinarily observed to be rigid and stiff. These experiments show that the present method can result in an increase in the plasticity of a polymer, i.e., its ability to be subjected to stress without breaking, and the elasticity of a polymer, i.e., its ability to return to its original shape when an applied stress is removed.

Referring again to FIG. 1, it can be further seen that the flexural strength of the treated polymer was significantly unchanged for the first 2–3 days of the in vitro study. In contrast, the untreated polymer rapidly lost flexural strength during the same period. Therefore, another beneficial result of the instant method is the prolongation of the initial in vivo flexural strength of the polymer after it has been implanted inside the body. This is a significant advantage since it is considered highly desirable for implantable bioabsorbable medical devices to retain their initial strength where it is often most critical.

It will be understood that various modifications may be made to the embodiments disclosed herein. Therefore, the above description should not be construed as limiting but merely as exemplifications of preferred embodiments. Those skilled in the art may envision other modifications within the scope and spirit of the claims appended hereto.

What is claimed is:

1. A medical device comprising a biocompatible polymer containing a plasticizer, said plasticizer being incorporated in the polymer as a supercritical fluid under conditions of temperature and pressure.

2. The medical device of claim 1 wherein the medical device is stored in an environment containing the plasticizer.

3. The medical device of claim 2 wherein the plasticizer is $CO_2$.

* * * * *